United States Patent [19]

Miller

[11] 4,448,153

[45] May 15, 1984

[54] WATER INJECTION SYSTEM FOR A COMBUSTION ENGINE

[75] Inventor: Robert J. Miller, Warren, Mich.

[73] Assignee: Colt Industries Operating Corp., New York, N.Y.

[21] Appl. No.: 307,790

[22] Filed: Oct. 2, 1981

[51] Int. Cl.³ .............................................. F02M 25/04
[52] U.S. Cl. ................................. 123/25 J; 123/25 L; 123/198 A
[58] Field of Search .................. 123/25 R, 25 A, 25 J, 123/25 K, 25 L, 25 M, 25 N, 198 A; 261/18 A

[56] References Cited

U.S. PATENT DOCUMENTS

| | | | |
|---|---|---|---|
| 2,554,612 | 5/1951 | Bills et al. | 123/25 J |
| 3,631,843 | 1/1972 | Yeiser | 123/25 M |
| 3,911,871 | 10/1975 | Williams et al. | 123/25 K |
| 4,096,829 | 6/1978 | Spears | 123/25 J |
| 4,311,118 | 1/1982 | Slagle | 123/25 J |
| 4,351,289 | 9/1982 | Renda | 123/25 J |

*Primary Examiner*—Ira S. Lazarus
*Attorney, Agent, or Firm*—Walter Potoroka, Sr.

[57] ABSTRACT

An internal combustion engine is shown having an intake manifold and carburetor to which water is injected or sprayed by an electrically powered pump receiving water from a reservoir; switches responsive to engine temperature, engine oil pressure and engine intake manifold vacuum serve to determine whether the circuitry for energizing the pump will be opened or closed; a valve member responsive to the intake manifold vacuum serves to permit a greater rate of flow of the water to the engine upon the manifold vacuum decreasing to a predetermined magnitude.

30 Claims, 4 Drawing Figures

4,448,153

WATER INJECTION SYSTEM FOR A COMBUSTION ENGINE

FIELD OF THE INVENTION

This invention relates generally to combustion engines and more particularly to a water injection apparatus and system for use in combination with such engines.

BACKGROUND OF THE INVENTION

Heretofore it has been known, in the prior art, that water, when added to the combustible mixture or motive fluid supplied to the engine, could provide a cooling effect upon such mixture or motive fluid and could, in effect, increase the effective octane number thereof thereby, of course, improving the anti-knock quality of the combustible mixture and the smoothness of engine operation.

However, the problems associated with the proper delivery of such water have, in the prior art, prevented a general acceptance of such water injection. In order to obtain the benefits of water injection, the rate of flow of the water being injected should have some relationship at least to the engine load and speed. Heretofore, the prior art has employed a vacuum actuated switch which, when actuated at a preselected magnitude of engine or intake manifold vacuum, would permit the continued flow of water to be supplied to the engine for all subsequent conditions of engine operation which produced an engine or intake manifold vacuum equal to or less than the said preselected magnitude.

The prior art has also proposed providing a reservoir of water with a conduit connection to the fuel induction passage means wherein such water would be discharged into the induction passage means by aspiration. Also, other very complicated and costly metering systems have been proposed by the prior art; however, as already stated, none of such prior art systems have enjoyed general acceptance.

Accordingly, the invention as herein disclosed is primarily directed to the solution of at least some of the problems of the prior art structures and to the providing of a water injection system which is relatively inexpensive, dependable in operation and effective for providing water injection at a rate which effective for producing the desired effect for those conditions of engine operation wherein the said effect is most beneficial.

SUMMARY OF THE INVENTION

According to the invention a water injection system for a combustion engine comprises reservoir means for containing a supply of water, pump means for pumping said water from said reservoir to said engine, and means responsive to indicia of engine load for at times permitting water pumped by said pump means to be discharged to said engine, said means responsive to indicia of engine load being effective to permit a plurality of rates of flow of said water to be discharged to said engine.

Other general and specific objects, aspects and advantages of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted.

DETAILED DESCRIPTION OF THE PREFERRED EMBODIMENT

Figure 1:
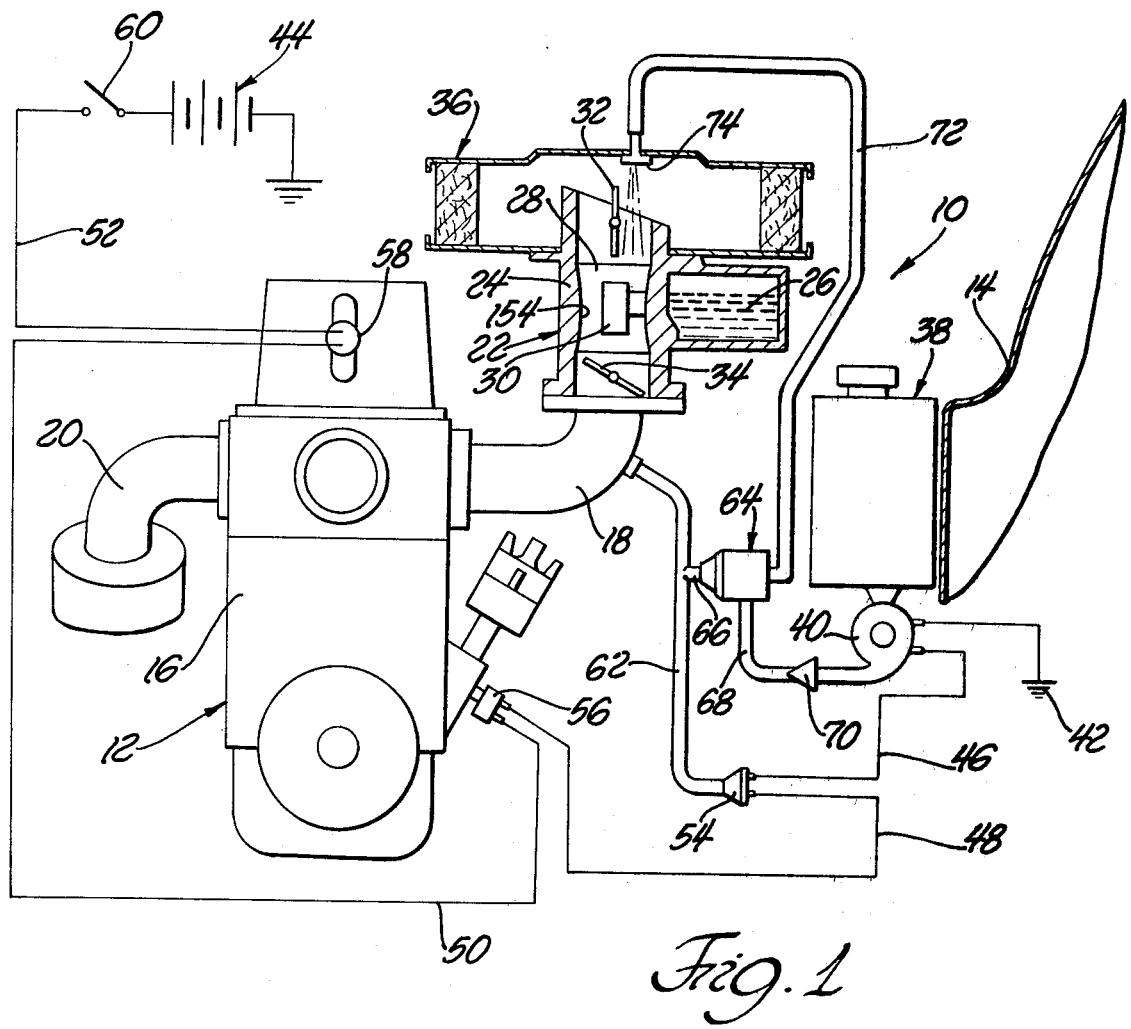
FIG. 1 is a generally schematic illustration of a combustion engine in combination with a water injection system employing teachings of the invention.

Referring now in greater detail to the drawings, FIG. 1 illustrates a water injection system 10, embodying teachings of the invention, in combination with an internal combustion engine 12 as may be employed in, for example, an automotive type vehicle, a fragmentary portion of which is illustrated at 14.

As generally depicted, the engine 12 may be comprised of an engine block assembly 16 having intake manifold means 18 and exhaust manifold or conduit means 20. Suitable fuel supply or metering means 22 serve to supply a motive fluid or combustible mixture to the engine intake manifold means 18. In the embodiment depicted, the fuel metering means 22 comprises carbureting means, in turn, comprised of body means 24, suitable fuel reservoir means 26, and induction passage means 28. The induction passage means 28 may, in turn, be provided with the usual fuel discharge means (a main nozzle being depicted at 30 and, if any, idle and/or off-idle fuel discharge means not shown but well known in the art). Suitable choke valve means 32 may be provided as to control the flow of air into the inlet end of the induction passage means 28 while operator positionable throttle valve means 34 may be provided to variably and selectively control the discharge of motive fluid or combustible mixture from the carburetor induction passage means and into the engine intake passage means 18. The fuel metering means 22 is shown provided with an associated air cleaner assembly 36 which, as is well known in the art, serves to filter out foreign particles carried by the air prior to the induction of such air.

A liquid or water reservoir 38, shown as being operatively carried by the vehicle structure 14, is in communication with motor driven pump means 40 the electric motor of which may be electrically grounded as at 42. In the preferred embodiment, the motor of pump means 40 is electrically connected to a suitable source of electrical potential 44 as by conductor means 46, 48, 50 and 52 and switch means 54, 56, 58 and 60 wherein switch 60 may be the operator-positioned vehicular ignition switch means.

More particularly, switch means 54 is pressure responsive and serves to complete and open the electrical circuit as between conductors 46 and 48; switch means 56 is also pressure responsive and serves to complete and open the electrical circuit as between conductors 48 and 50; switch means 58 is temperature responsive and serves to complete and open the electrical circuit as between conductors 50 and 52, while, of course, where employed, switch means 60 serves to complete and open the entire circuit with respect to the source of electrical potential 44 which, even though shown as a battery may, nevertheless, comprise suitable alternator or generator means.

Temperature switch or transducer means 58 senses the engine temperature and, in the preferred embodiment, serves to complete the circuit between conductor means 52 and 50 whenever the engine 12 attains a preselected operating temperature such as, for example, what is commonly referred to as the engine normal operating temperature.

Pressure switch or transducer means 56 senses the engine oil pressure and, if the sensed engine oil pressure should drop below a preselected magnitude (or if the oil pressure fails to attain the preselected magnitude) pressure sensor means 56 serves to open (or maintain open) the circuit between conductor means 50 and 48.

Pressure switch or transducer means 54 senses the magnitude of the engine developed intake manifold vacuum and upon such vacuum decreasing to a preselected magnitude of intake manifold vacuum, the sensor means 54 serves to complete the electrical circuit through conductor means 48 and 46.

Suitable conduit means 62 serves to operatively interconnect the vacuum responsive switch or transducer means 54 as to the intake manifold means 18 as to thereby transmit the magnitude of the vacuum therein to switch means 54. As also depicted, associated valving means 64 is also operatively connected as via conduit means 66 and 62 to the intake manifold as to also be responsive to and acted upon by the vacuum within intake manifold 18.

Figure 2:
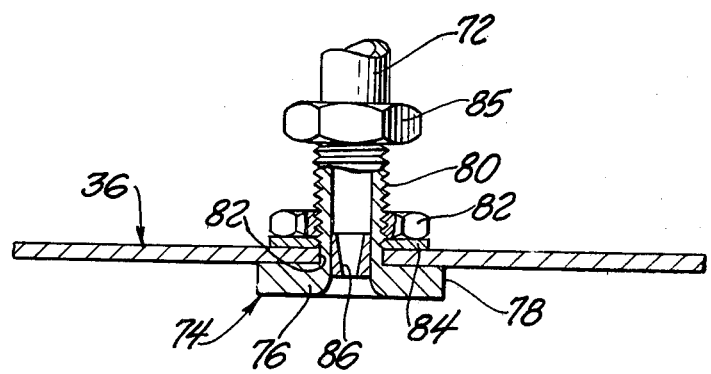
FIG. 2 is an enlarged cross-sectional view of a portion of the structure shown in FIG. 1.

Generally, the water supplied by motor pump means 40 is directed through conduit means 68, comprising suitable check-valve means 70, to valving means 64 and then out of valving means 64 through conduit means 72 and spray nozzle means 74 to the induction passage 28 as, preferably, at a point or points upstream of the throttle valve means 34. As generally shown in FIG. 2, the nozzle 74 may be comprised of a discharge nozzle body 76 which has a relatively enlarged head portion 78, disposed as on the interior of the air cleaner assembly 36, and a threaded tubular shank-like portion 80, passing through an aperture or clearance means 82 of the air cleaner 36, which cooperates with a nut 82 as for securing the nozzle body 76 to the top of the housing means of the air cleaner assembly 36. An annular washer and/or seal may be provided as at 84. Suitable coupling means 85 may be employed for coupling the nozzle body 76 to the related conduit means 72. In the preferred embodiment suitable restriction or spray causing or generating means 86 is provided to enhance the breaking of the water being injected into a fine droplet or mist form.

Figure 3:
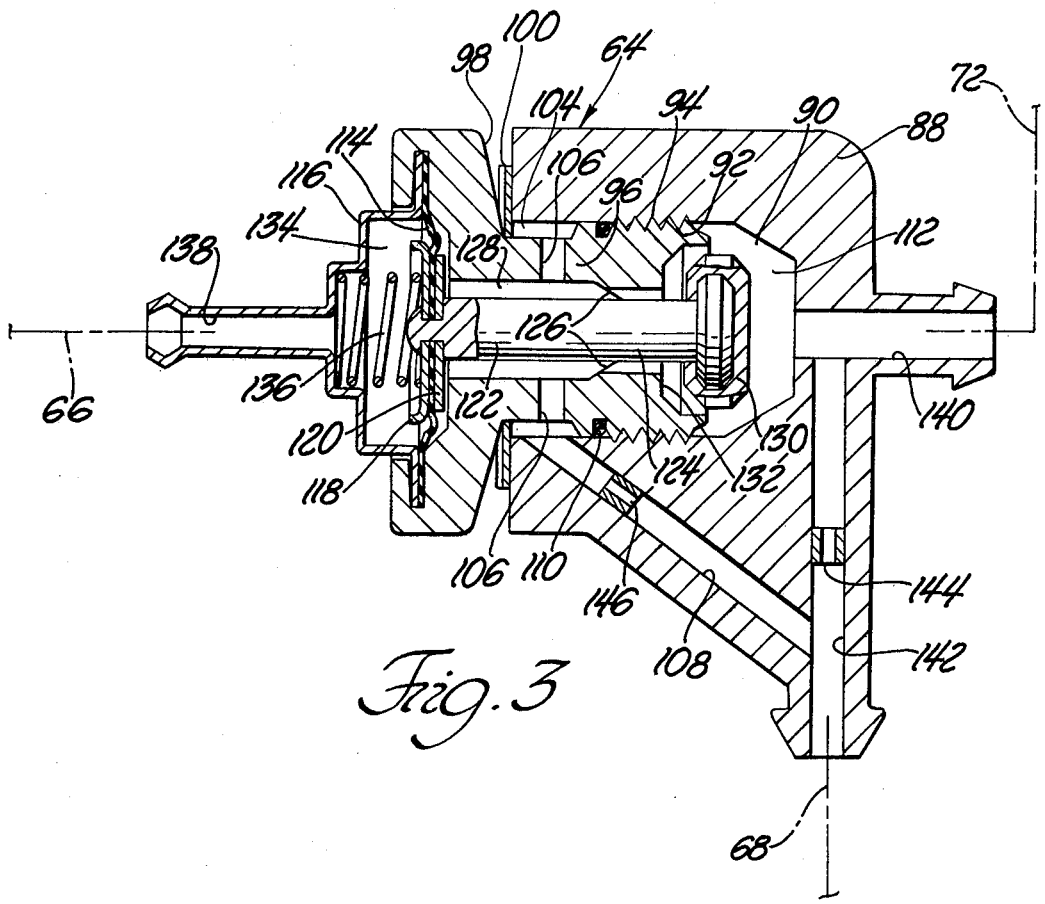
FIG. 3 is an enlarged cross-sectional view of one of the valving means depicted in FIG. 1.

FIG. 3, in enlarged scale, and in cross-section, illustrates one form (among others) of valving means 64 employable in the practice of the invention. In the preferred embodiment, the valving means 64 comprises a main body 88 with a chamber 90 formed therein which is provided as with an internally threaded portion 92 which threadably engages an externally threaded portion 94 of an inner valve housing or body 96. The inner valve housing 96 is provided as with an enlarged head-like portion 98 which urges against a suitable annular seal 100 as to thereby contain the seal generally between the head portion 98 and body 88. In so doing, a neck-down portion 102 of inner valve housing 96 serves to define a generally annular chamber 104 which communicates with a plurality of passages 106 formed in inner housing 96 and also communicates with a conduit 108.

A second seal, such as an O-ring 110, for example, may be provided as to sealingly separate annular chamber 104 from a second chamber portion 112 within cavity 90.

A pressure responsive wall means or diaphragm means 114 is sealingly peripherally contained generally between head end 98 and a cooperating cover or housing member 116 and, in turn, is operatively connected, as through diaphragm backing plates 118 and 120, to a stem portion 122 of an axially positionable valving means 124. The valving means 124 is slidably guided as by a plurality of generally axially directed fluted portions 126 which, by virtue of being fluted, permit the flow of liquid therethrough. The fluted portions communicate with a generally enlarged chamber 128, circumscribing a portion of the valve stem 122. Accordingly, it can be seen that a path of communication is established as from annular chamber 104, through conduits or passages 106, chamber 128 and fluted passages or grooves 126. The end of valving means 124 may be provided as with a valving head or member 130 which, when seated as against a valve seating surface 132, serves to terminate further communication as between fluted passages 126 and chamber portion 112.

The cover or housing member 116 cooperatively define a variable chamber 134 which generally contains resilient means 136, normally urging the diaphragm 114 and valving means 124 to the position depicted, and is in communication with a source of manifold vacuum via conduit portion 138 which, as generally illustrated in FIG. 1, may comprise a portion of the conduit means 66.

A conduit or passage portion 140, in housing or body 88, serves to complete communication as between chamber portion 112 and conduit means 72 while a second conduit 142, also formed in housing or body 88, serves to complete communication as between conduit means 68 and chamber portion 112 or, as illustrated, conduit 140. In the preferred embodiment, calibrating restriction means 144 is provided in as to comprise a portion of conduit means 142. Conduit 108 is formed as to communicate with annular chamber 104 and with the liquid upstream of restriction means 144. Also, in the preferred embodiment, calibrating restriction means 146 is provided in as to comprise a portion of conduit means 108.

Generally, when the magnitude of the manifold vacuum is equal to or greater than a preselected magnitude, diaphragm 114 will move to the left (as viewed in FIG. 3) against the resilient resistance of spring means 136 thereby causing valve member 130 to become seated against seating surface 132.

OPERATION OF THE INVENTION

First let it be assumed that the engine 12 is shut-down and cold (at a temperature less than a preselected minimum operating temperature). At this time, regardless of whether switch means is open or closed, the circuit to the pump-motor means 40 is opened by virture of: (a) switch means 58 being opened because of the engine being at an under-temperature condition; (b) switch means 56 being opened because of no oil pressure being sensed due to engine shut-down; and (c) switch means 54 being opened because of the non-existence of any engine-developed vacuum in the intake manifold 18. Further, because of the absence of such manifold vacuum, spring 136 (FIG. 3) causes the valve member 130 to be in an opened position as generally illustrated.

Next, let it be assumed, for purposes of illustration, that the various constants in the overall system are selected so that: (a) the temperature responsive switch means 58 closes the circuit through conductors 52 and 50 only upon, and thereafter, the engine 12 attaining its normal engine operating temperature; (b) switch 56 is effective to close the electrical circuit through conductors 50 and 48 only when there is a preselected minimal magnitude of engine oil pressure such as would be indicative of the engine actually operating and not, for example, being stalled; (c) switch means 54 is effective for closing the electrical circuit through conductors 48 and 46 only for those magnitudes of manifold vacuum equal to or less than 6.0 inches of Hg. and (d) that spring 136 (FIG. 3) is of a preload and force as to be effective to move valving means 124 and valve member 130 to the open position (as illustrated) only upon the magnitude of manifold vacuum decreasing to 3.0 inches of Hg. and to maintain the valve member 130 open at all lesser magnitudes.

Now it should be apparent, that, with such assumed values, with switch 60 closed and the engine 12 operating the motor-pump means 40 will be maintained inoperative at least until such time as temperature sensing means 58 senses that the engine 12 has attained its preselected minimal operating temperature (assumed to be normal engine operating temperature). If it is further assumed that the engine 12 is running at curb-idle and becoming warmed, it should be apparent that the means 56 senses operation of the engine 12, through the presence of an engine oil pressure, and has closed the circuit through conductors 50 and 48. When, the engine 12 attains the preselected minimum operating temperature, and if yet at idle, switching means 58 will then close the circuit through conductors 52 and 50. At that time, the electrical circuit will be closed from the source of electrical potential 44 to switching means 54 where the circuit as between conductors 48 and 46 remains open. This is so because, as previously assumed, switch means 54 is effective for closing the circuit between conductors 46 and 48 only upon the magnitude of the sensed manifold vacuum decreasing to 6.0 inches of Hg. During idle engine operation the magnitude of the manifold vacuum may be in the order of 20.0 (or more) inches of Hg. Therefore, the motor-pump means 40 remains de-energized and no water is injected into the engine 12.

Now let it be assumed that the sufficiently warmed engine 12, and associated vehicle, are now operating, for example, in at least the off-idle range and that the magnitude of manifold vacuum has decreased to 6.0 inches of Hg. At this time switch means 54 serves to complete the circuit through conductors 48 and 46 (switch 58 and 56 having previously completed the portions of the circuit through conductors 52, 50 and 50, 48) thereby energizing the motor-pump means 40 causing the pump means 40 to supply water, from reservoir means 38, to the engine 12.

It should be pointed-out that if after the manifold vacuum has decreased to 6.0 inches of Hg. (or less) and the vehicle operator, for example, closes the throttle means 34 to thereby result in vehicle deceleration wherein, for example, the vehicle at least tends to drive the engine, the magnitude of the manifold vacuum will, effectively, suddenly increase to an order of magnitude greater than 6.0 inches of Hg. and approaching, or even exceeding, the magnitude of manifold vacuum at idle engine operation. When such deceleration occurs, switch means 54 again opens the circuit between conductors 48 and 46 which, in turn, results in the de-energization of motor-pump means 40.

It should now be apparent that by providing the engine temperature sensitive switching means 58 that tendencies for carburetor or induction passage icing, as otherwise might occur due to the injected water vapor and cold induction passage and/or throttle valve, are prevented in that no such water is injected until the engine 12 does first attain the preselected minimum operating temperature. Further, if the engine 12 should, for example, stall, during its operation, the oil pressure sensitive switch means 56 would immediately respond to the loss of engine oil pressure and cause the circuit to the pump means 40 to be opened thereby preventing the further injecting of water into such a stalled engine.

Generally, as depicted in FIG. 1, water, pumped by motor-pump means 40, flows through conduit means 68, valving means 64, conduit means 72 and finally, through nozzle means 74 into the induction passage means 28. As was previously assumed, valve member 130 is held closed against coacting valve seat 132 for all values of manifold vacuum greater than 3.0 inches of Hg.

Figure 4:
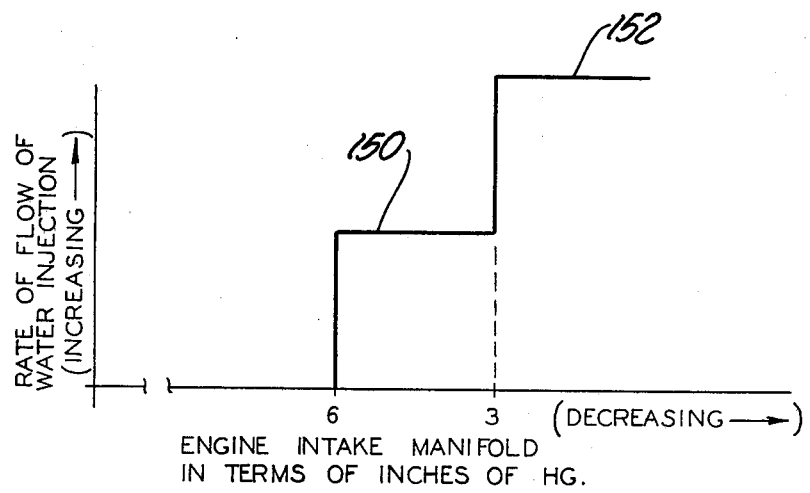
FIG. 4 is a graph depicting the operation of the water injection system of FIG. 1.

Therefore, for all conditions of engine operation, wherein motor-pump means 40 is energized and engine loads are such as to result in the intake manifold vacuum being greater than 3.0 inches of Hg. the water supplied via conduit means 68 will flow only through conduit means 142 (bypassing the valve member 130) and out through conduit means 140 to conduit means 72. In the main, the pump pressure, which may be generally constant, and the effective flow area of calibrating restriction means 144 determine the volume flow rate of water delivered for injection by nozzle 74. This is generally depicted by the graph of FIG. 4 wherein it is shown that, for example, when switch means 54 senses the attainment (and thereafter) 6.0 inches of Hg., water is delivered at a generally constant rate (per unit of time) at a magnitude or rate generally depicted by the line 150. That is, at nearly 6.0 inches of Hg. there was no water being delivered and that at attainment of 6.0 inches of Hg. the rate of water flow (for all practical purposes) went from zero-flow to the magnitude or rate represented by line 150.

However, as also previously stated, when the intake manifold vacuum magnitude decreases to, for example, the assumed value of 3.0 inches of Hg., thereby indicating that the engine 12 is operating at a preselected increased load, spring 136 of valving means or assembly 64 opens valve member 130 thereby permitting flow through the passages defined by fluted portions 126 (FIG. 3). When this occurs, the water supplied by conduit means 68 actually has two paths through which to simultaneously flow.

That is, water now flows through conduit means 142 into and out of conduit means 140 as well as through conduit means 108 and calibrated restriction means 146 into annular chamber 104 from where it continues to flow through conduit means 106, chamber 128, passages 126 and into chamber portion 112 finally exiting into conduit means 140. Accordingly, it can be seen that when the preselected increased engine load (as selected by the assumed value of 3.0 inches of Hg.) is experienced, parallel paths for water flow through the valving means 64 are established and that, therefore, an increase in the rate of water flow to the engine results. This is generally depicted in FIG. 4 wherein at a value or magnitude of 3.0 inches of Hg. the rate of flow of injected water is shown to increase from the magnitude depicted by line 150 to the magnitude depicted by line 152 of FIG. 4.

If desired, a plurality of valving assemblies 64 could be employed, for example, in series with each other as to provide for a further plurality of increases or variations in the rate of water flow permitted for other magnitudes of intake manifold vacuum.

Preferably, as illustrated, suitable check valve means 70 are provided as to, for example, prevent reverse flow through conduit means 68.

It should be apparent that the term "water" employed herein is intended to encompass not only those situations where water, by itself, is being injected but also those situations wherein, for example, a mixture or blend of water and a suitable anti-freezing liquid or the like is being injected.

The motor-pump means 40 has been depicted as being situated externally of the reservoir 38. It should be apparent that such pumping means 40 could equally well be situated within the reservoir 38 either submerged or not.

As depicted, in the preferred embodiment, the water being injected is injected into the intake of the induction passage means 28. By doing so, first the sprayed water has, in effect, what may be considered a relatively long path of flow before actual discharge into, for example, the engine intake manifold. Such increased flow distance also increases the time which is available for the water particles to fully vaporize within the motive fluid being supplied to the engine. Further, by injecting or spraying the water into the air mass, moving into the induction passage means, it causes the pressure of the air mass to decrease prior to its passage or flow through, for example, the main venturi (as generally depicted at 154 of FIG. 1), in turn, causing the water particles to undergo greater vaporization. The increased vaporization (and therefore the attendant greater uniformity of water dispersion within the motive fluid) is not materially effected by its passage through such main venturi means.

Although only a preferred embodiment, and select modifications of the invention have been disclosed and described, it is apparent that the embodiments and modifications of the invention are possible within the scope of the appended claims.

What is claimed is:

1. A water injection system for a combustion engine, comprising reservoir means for containing a supply of water, pump means for pumping said water from said reservoir to said engine, means responsive to indicia of engine load for at times permitting water pumped by said pump means to be discharged to said engine, said means responsive to indicia of engine load being effective to permit a plurality of generally constant rates of flow of said water to be discharged to said engine in a manner whereby there is no cessation of the flow of said water as between succeeding ones of said plurality of generally constant rates of flow of said water, and water flow circuit means communicating generally between said pump means and said engine, wherein said water flow circuit means comprises parallel flow paths, wherein said means responsive to indicia of engine load comprises a valve member, and wherein said valve member controls the flow of said water through at least one of said parallel flow paths.

2. A water injection system according to claim 1 wherein said pump means is electrically driven.

3. A water injection system according to claim 1 and further comprising electric motor means for driving said pump means, electric circuit means for electrically interconnecting said electric motor means to a related source of electrical potential, and wherein said means responsive to indicia of engine load comprises switching means for opening and closing said electric circuit means.

4. A water injection system according to claim 1 and further comprising means responsive to the temperature of said engine for preventing any of said water from being discharged to said engine before said engine attains a preselected minimum operating temperature.

5. A water injection system according to claim 1 and further comprising means responsive to the magnitude of the engine lubricating oil pressure for preventing any of said water from being discharged to said engine before said engine lubricating oil pressure attains a preselected minimum magnitude.

6. A water injection system according to claim 1 wherein said means responsive to indicia of engine load is effective for preventing any of said water from being discharged to said engine before said engine experiences a preselected minimum load.

7. A water injection system according to claim 1 and further comprising electric motor means for driving said pump means, electric circuit means for electrically interconnecting said electric motor means to a related source of electrical potential, and wherein said means responsive to indicia of engine load comprises switching means for opening said electric circuit means at engine loads less than a preselected minimum engine load.

8. A water injection system according to claim 1 and further comprising electric motor means for driving said pump means, electric circuit means for electrically interconnecting said electric motor means to a related source of electrical potential, and means responsive to the temperature of said engine, said means responsive to the temperature of said engine being effective to open said electric circuit means at magnitudes of engine temperature less than a preselected magnitude of engine temperature.

9. A water injection system according to claim 1 and further comprising electric motor means for driving said pump means, electric circuit means for electrically interconnecting said electric motor means to a related source of electrical potential, and means responsive to the magnitude of the engine lubricating oil pressure for opening said electric circuit means when said engine lubricating oil pressure is of a magnitude less than a preselected minimum magnitude.

10. A water injection system according to claim 1 and further comprising electric motor means for driving said pump means, electric circuit means for electrically interconnecting said electric motor means to a related source of electrical potential, and means responsive to the temperature of said engine, said means responsive to the temperature of said engine being effective to open said electric circuit means at magnitudes of engine temperature less than a preselected magnitude of engine temperature, and wherein said means responsive to indicia of engine load comprises switching means for opening said electric circuit means at engine loads less than a preselected minimum engine load.

11. A water injection system according to claim 1 and further comprising electric motor means for driving said pump means, electric circuit means for electrically interconnecting said electric motor means to a related source of electrical potential, means responsive to the temperature of said engine, said means responsive to the temperature of said engine being effective to open said electric circuit means at magnitudes of engine temperature less than a preselected magnitude of engine temperature, and means responsive to the magnitude of the engine lubricating oil pressure for opening said electric circuit means when said engine lubricating oil pressure is of a magnitude less than a preselected minimum magnitude.

12. A water injection system according to claim 1 and further comprising electric motor means for driving said pump means, electric circuit means for electrically interconnecting said electric motor means to a related source of electrical potential, and means responsive to the magnitude of the engine lubricating oil pressure for opening said electric circuit means when said engine lubricating oil pressure is of a magnitude less than a preselected minimum magnitude, and wherein said means responsive to indicia of engine load comprises switching means for opening said electric circuit means at engine loads less than a preselected minimum engine load.

13. A water injection system according to claim 1 and further comprising electric motor means for driving said pump means, electric circuit means for electrically interconnecting said electric motor means to a related source of electrical potential, means responsive to the magnitude of the engine lubricating oil pressure for opening said electric circuit means when said engine lubricating oil pressure is of a magnitude less than a preselected minimum magnitude, and said means responsive to the temperature of said engine being effective to open said electric circuit means at magnitudes of engine temperature less than a preselected magnitude of engine temperature, and wherein said means responsive to indicia of engine load comprises switching means for opening said electric circuit means at engine loads less than a preselected minimum engine load.

14. A water injection system according to claim 1 and further comprising fuel metering means associated with said engine for supplying rates of metered fuel flow to said engine, said fuel metering means comprising induction passage means, and wherein said water is discharged into the inlet of said induction passage means.

15. A water injection system according to claim 14 wherein said induction passage means comprises venturi means, and wherein said water is discharged into said inlet of said induction passage means upstream of said venturi means.

16. A water injection system according to claim 13 and further comprising fuel metering means associated with said engine for supplying rates of metered fuel flow to said engine, said fuel metering means comprising induction passage means, and wherein said water is discharged into the inlet of said induction passage means.

17. A water injection system according to claim 12 and further comprising fuel metering means associated with said engine for supplying rates of metered fuel flow to said engine, said fuel metering means comprising induction passage means, and wherein said water is discharged into the inlet of said induction passage means.

18. A water injection system according to claim 11 and further comprising fuel metering means associated with said engine for supplying rates of metered fuel flow to said engine, said fuel metering means comprising induction passage means, and wherein said water is discharged into the inlet of said induction passage means.

19. A water injection system according to claim 10 and further comprising fuel metering means associated with said engine for supplying rates of metered fuel flow to said engine, said fuel metering means comprising induction passage means, and wherein said water is discharged into the inlet of said induction passage means.

20. A water injection system according to claim 9 and further comprising fuel metering means associated with said engine for supplying rates of metered fuel flow to said engine, said fuel metering means comprising induction passage means, and wherein said water is discharged into the inlet of said induction passage means.

21. A water injection system according to claim 8 and further comprising fuel metering means associated with said engine for supplying rates of metered fuel flow to said engine, said fuel metering means comprising induction passage means, and wherein said water is discharged into the inlet of said induction passage means.

22. A water injection system according to claim 7 and further comprising fuel metering means associated with said engine for supplying rates of metered fuel flow to said engine, said fuel metering means comprising induction passage means, and wherein said water is discharged into the inlet of said induction passage means.

23. A water injection system according to claim 22 wherein said induction passage means comprises venturi means, and wherein said water is discharged into said inlet of said induction passage means upstream of said venturi means.

24. A water injection system according to claim 21 wherein said induction passage means comprises venturi means, and wherein said water is discharged into said inlet of said induction passage means upstream of said venturi means.

25. A water injection system according to claim 20 wherein said induction passage means comprises venturi means, and wherein said water is discharged into said inlet of said induction passage means upstream of said venturi means.

26. A water injection system according to claim 19 wherein said induction passage means comprises venturi means, and wherein said water is discharged into said inlet of said induction passage means upstream of said venturi means.

27. A water injection system according to claim 18 wherein said induction passage means comprises venturi means, and wherein said water is discharged into said inlet of said induction passage means upstream of said venturi means.

28. A water injection system according to claim 17 wherein said induction passage means comprises venturi means, and wherein said water is discharged into said inlet of said induction passage means upstream of said venturi means.

29. A water injection system according to claim 16 wherein said induction passage means comprises venturi means, and wherein said water is discharged into said inlet of said induction passage means upstream of said venturi means.

30. The combination of an internal combustion engine, engine intake manifold means, a carburetor operatively connected to said intake manifold means, said carburetor comprising induction passage means, said induction passage means communicating with said intake manifold means and comprising venturi means, a variably positionable throttle valve for variably controlling the rate of discharge of motive fluid from said induction passage means to said intake manifold means, said engine containing lubricating oil which when under pressure is effective to lubricate said engine, reservoir means for containing a supply of water, pump means for pumping said water from said reservoir to said engine, electric motor means for driving said pump means, water conveying conduit means for conveying said water from said pump means to said engine, electric circuit means electrically interconnecting said electric motor means to a related source of electrical potential, first electric switch means responsive to engine temperature and effective for opening said electric circuit means when the temperature of said engine is less than a preselected magnitude of temperature, second electric switch means responsive to the pressure of said lubricating oil and effective for opening said electric circuit means when the pressure of said lubricating oil is less than a preselected magnitude of pressure, third switch means responsive to the magnitude of the intake vacuum downstream of said throttle valve and effective upon said intake vacuum decreasing to a preselected magnitude of intake vacuum for closing said electric circuit means, and pressure responsive valve means in circuit with said water conveying conduit means, said pressure responsive valve means being responsive to the magnitude of said intake vacuum and effective during such periods of operation as when said intake vacuum has not yet attained a predetermined magnitude of intake vacuum for permitting a first generally constant rate of flow of said water from said pump means to said engine, said pressure responsive valve means also being effective during such periods of operation as when said intake vacuum has attained said predetermined magnitude of intake vacuum for permitting a second generally constant rate of flow of said water from said pump means to said engine, said second generally constant rate being greater than said first generally constant rate, and said first and second generally constant rates occurring in a manner whereby there is no cessation of flow of said water as between said first and second rates of flow of said water.

* * * * *